United States Patent
Haepp et al.

(10) Patent No.: US 7,618,191 B2
(45) Date of Patent: Nov. 17, 2009

(54) WHEEL BEARING ARRANGEMENT COMPRISING AN ENCODER AND A SENSOR

(75) Inventors: Alexander Haepp, Lenderhausen (DE); Wilhelm Walter, Poppenhausen (DE)

(73) Assignee: Schaeffler KG, Herzogenaurach (DE)

( * ) Notice: Subject to any disclaimer, the term of this patent is extended or adjusted under 35 U.S.C. 154(b) by 388 days.

(21) Appl. No.: 11/569,525

(22) PCT Filed: May 21, 2005

(86) PCT No.: PCT/DE2005/000933

§ 371 (c)(1),
(2), (4) Date: Nov. 22, 2006

(87) PCT Pub. No.: WO2005/116664

PCT Pub. Date: Dec. 8, 2005

(65) Prior Publication Data

US 2008/0044118 A1 Feb. 21, 2008

(30) Foreign Application Priority Data

May 28, 2004 (DE) .................. 10 2004 026 199

(51) Int. Cl.
*F16C 32/00* (2006.01)
(52) U.S. Cl. ...................... 384/448; 384/544
(58) Field of Classification Search ............ 384/448, 384/544, 589; 324/173, 174, 207.25
See application file for complete search history.

(56) References Cited

U.S. PATENT DOCUMENTS

| 4,864,231 | A | * | 9/1989 | Okumura et al. ............ 324/173 |
| 5,293,124 | A | | 3/1994 | Caillaut et al. |
| 5,898,388 | A | | 4/1999 | Hofmann et al. |
| 5,969,518 | A | | 10/1999 | Merklein et al. |
| 7,034,521 | B2 | * | 4/2006 | Sentoku et al. ............ 324/174 |
| 7,077,574 | B2 | * | 7/2006 | Niebling et al. ............ 384/448 |
| 2005/0047692 | A1 | * | 3/2005 | Niebling et al. ............ 384/448 |

FOREIGN PATENT DOCUMENTS

JP  2001056236 X  2/2001

* cited by examiner

*Primary Examiner*—Thomas R Hannon
(74) *Attorney, Agent, or Firm*—Lucas & Mercanti, LLP

(57) ABSTRACT

The invention relates to a wheel bearing arrangement, comprising at least one encoder, at least one sensor, a seal arranged concentrically to the rotational axis and a hub mounted to rotate in the wheel bearing arrangement, whereby a radial flange on the hub, faces radially away from the rotation axis and the seal seals at least one radial annular gap around the hub on the side of the radial flange. The seal comprises at least one cover ring, made from a non-ferromagnetic material and at least one elastic first sealing lip, the first sealing lip is fixed to the cover ring and makes sealing contact with the encoder and at least one signal-active part of the encoder is arranged on the inside of the seal and rotates about the rotational axis with the hub.

14 Claims, 2 Drawing Sheets

WHEEL BEARING ARRANGEMENT COMPRISING AN ENCODER AND A SENSOR

FIELD OF THE INVENTION

The invention relates to a wheel bearing arrangement having at least one encoder, having at least one sensor, having a seal which is arranged concentrically with respect to the rotational axis, and having a hub which is mounted in the wheel bearing arrangement so as to be rotationally moveable, with:
- a radial flange of the hub being aligned radially away from the rotational axis,
- the seal sealing off at least one radial annular gap around the hub at the side of the radial flange,
- the seal having at least one covering ring, which is made from a non-ferromagnetic material, and at least one elastic first sealing lip,
- the first sealing lip being fixed to the covering ring and bearing sealingly against the encoder,
- the encoder being arranged at the inside of the seal and being rotationally moveable about the rotational axis with the hub.

BACKGROUND OF THE INVENTION

A wheel bearing arrangement of said type is described in U.S. Pat. No. 4,864,231. A hub is rotatably mounted in the wheel bearing. A radial flange for fastening a vehicle wheel is provided on the hub. Here, the sealing arrangement is situated on that side of the wheel bearing arrangement which faces towards the vehicle wheel. The sensor which is integrated into the wheel bearing arrangement is situated opposite the encoder with an air gap. For this purpose, the sensor is mounted in a passage hole in the outer ring of the wheel bearing. When mounting the sensor and when exchanging the sensor during the course of repair work, there is the risk of dirt passing into the interior of the seal and therefore into the region of rolling contact between the rolling bodies and the rolling bodies. After a shorter or longer running period of the bearing, dirt from the environment infiltrates the seal which bears against the encoder, and said seal becomes untight. In both cases, the service life of the wheel bearing is shortened disadvantageously.

SUMMARY OF THE INVENTION

It is therefore the object of the invention to provide a wheel bearing arrangement of the generic type which provides better protection from environmental influences.

The object is achieved by means of a wheel bearing arrangement having at least one encoder, having at least one sensor, having a seal and having a hub which is mounted in the wheel bearing arrangement so as to be rotatable about a rotational axis of the wheel bearing. The wheel bearing arrangement according to the invention has the following features and configurations:

The invention can be applied to all known types of wheel bearings, such as for example those with one or more fixed outer rings and with hubs which are mounted in the outer ring so as to be rotationally moveable. At least one inner raceway and one outer raceway for rolling bodies of the wheel bearing is formed in the wheel bearing arrangement, whereas the outer raceway with the hub is rotationally moveable, about the rotational axis relative to the inner raceway on the outer ring. This relates inter alia to double-row and four-row wheel bearing sets having rollers or balls as rolling bodies, in particular wheel bearings in the form of angular roller bearings or angular contact ball bearings.

The wheel bearing sets optionally have single-part bearing rings with raceways for all of the rows, split bearing rings, or one bearing ring for each row, and combinations of said configurations. Inner rings are preferably seated on the hub, with the bearing engaging without play on the hub preferably by means of a flanged rim on the hub or by means of any other method. The raceways for rolling bodies are formed on rings provided on split inner and/or outer rings, or on rings which are integrally provided with at least two raceways. The outer rings are seated in a wheel carrier which itself is fastened to the vehicle. The one or more inner rings are seated on the hub. Alternatively, one or more raceways are formed directly on the hub. There are also outer rings in the form of wheel carriers which have a flange. At least one of the inner raceways is formed directly on an outer ring of said type. The flange on the outer ring is for fastening the wheel bearing to the vehicle. The radial flange on the hub is for fastening one or more vehicle wheels to the hub.

On the side of the radial flange, the sealing unit protects the interior of the wheel bearing from external environmental influences. The interior of the wheel bearing is to be understood at least as the radial annular gap between the outer ring and the inner ring and, arranged therein, the rolling bodies, cages for guiding the rolling bodies, as well as components of sensor devices of the wheel bearing and, if appropriate, further elements of the bearing which are arranged primarily radially between the inner and outer rings.

The seal is arranged concentrically with respect to the rotational axis and has at least one covering ring and at least two elastic sealing lips. The covering ring covers at least the signal-active part of the encoder, which is arranged in the interior of the seal. The covering ring:
- is largely rotationally symmetrical and is formed as a cap with a hole,
- engages around the hub and is rotationally fixedly seated on the wheel carrier, but is preferably rotationally fixedly seated on the outer ring,
- is preferably made from a non-ferromagnetic metal sheet or is alternatively also made from one or more non-ferromagnetic materials such as plastics and light metals,
- is preferably produced by means of a cold forming process such as deep-drawing, pressing, stamping or combinations of said methods,
- has a hollow cylindrical seat, by means of which the covering ring is preferably seated on the outer ring or else alternatively in the outer ring or on the wheel carrier,
- runs between the sensor and the signal-active encoder which is covered by the covering ring, with a hollow cylindrical first annular section of the covering ring preferably running between the sensor and the encoder, and the first annular section proceeding from the seat,
- preferably has a disk section which extends radially between the first annular section and a second annular section, with the disk section covering the interior of the wheel bearing axially and being situated axially opposite the radial flange,
- has the second annular section which is of hollow cylindrical design and is surrounded by the first annular section.

The sealing lips are of annular design and are preferably fastened to the covering ring by being injection-molded on, or are vulcanized onto the covering ring. A first sealing lip is sealingly preloaded, preferably radially in the direction of the rotational axis or else alternatively axially, against the encoder. One embodiment of the invention provides that the first sealing lip bears sealingly against the encoder at two points, with a free end of the sealing lip bearing sealingly against the web of the encoder, and that part of the sealing lip which precedes the free end bearing radially against the seat.

The sealing lip is also optionally preloaded by means of an annular spring which preloads at least one part of the sealing lip, which bears radially against the seat, against the seat. Alternatively, two first sealing lips are provided, one of which bears, for example, axially against the web, and the other of which bears against the seat of the encoder. The second sealing lip bears sealingly against that part of the radial flange which proceeds radially from the hub.

One embodiment of the invention provides that the first sealing lip is fixed to the second annular section. The second sealing lip, or preferably two second sealing lips, are preferably fixed to the disk section of the metal covering plate, and bear against an axial plane face of the radial flange or against the fillet, which is defined by at least one radius, between the hub and the radial flange. The sealing lips are generally mounted with a preload against the sealing faces on the encoder or on the radial flange. In practice, the preload is generally 0.2 mm.

In terms of the sealing function, the sealing lip which bears against the radial flange is arranged upstream of the sealing lip which bears against the encoder, so that an annular space is formed between the sealing lips. The annular space is optionally filled with grease. The sealing lips are made from an elastic sealing material such as elastomers or from a plurality of components of identical or different materials.

The encoder with the hub is rotationally moveable about the rotational axis relative to the second ring and is substantially composed, preferably in one piece, of the seat, a radial web between the seat and a further hollow cylindrical signal-active encoder section. The encoder is thus held on the rotating bearing ring or directly on the hub by means of a support which comprises a web and a seat and is preferably formed from sheet metal. The seat is of hollow cylindrical design and is pressed directly onto the hub or preferably onto an inner ring. The sealing lip which bears sealingly against the encoder preferably bears against a peripheral sealing face of the seat. The active encoder section is arranged concentrically with respect to the rotational axis and at least partially radially between the first annular section and the second annular section, and preferably runs around the seat. The preferred material for the encoder is sheet metal.

The term 'encoder' represents one or more single-part or multi-part encoders which are arranged at the periphery of the rotational axis. 'Signal-active' in this context is to be understood to mean all signal-emitting (pulse-emitting) and signal-reflecting arrangements and designs of encoders. The signal-active part of the encoder is therefore optionally a pulse ring made from sheet metal with free spaces which are delimited in the circumferential direction by webs, or a sheet metal ring that is of corrugated design in the circumferential direction. Alternatively, the encoder is made from alternately polarized material or from support material with magnetizable additives. Examples of such materials are plastics to which magnetizable material is added, or plastics which have magnetizable inserts. Alternatively, the encoder is made from a magnetizable metal. The encoder is therefore either a sheet metal element composed of a pulse emitter the web and the seat, or alternatively a pulse emitter, with alternating polarity, which is arranged on the sheet metal support composed of a seat and a web.

Additional space is provided for the encoder in the seal, axially between the covering cap and the end side of the outer ring, as a result of the end-side spacing between the preferably disk-shaped section of the covering ring and the end side of the outer ring. The encoder can therefore be designed more broadly in terms of its radial and axial dimensions, and projects radially into the axial free space between the covering cap and the outer ring. The arrangement of the encoder outside the annular gap provides the advantage that more space is made available for the arrangement of the seals of said sealing arrangement. The sensor unit having a radially outwardly aligned encoder requires a smaller radial installation depth than axially aligned encoders. The increased installation space can additionally be utilized for an optimum design of the seal, since there is only little existing radial installation space available for installing a seal.

The sensor is arranged at the outside of the seal and opposite the encoder, with the covering ring made from the non-ferromagnetic material extending at least between the encoder and the sensor. One or more sensors which are arranged outside the covering ring receive the signals of the encoder primarily in the radial direction, disregarding any scatter of said signals in other directions, or emit signals radially in the direction of the encoder. For this purpose, the alternatively signal-receiving, signal-reflecting or signal-generating side of the encoder is preferably aligned radially outward. The one or more sensors are either fixed to the bearing ring/wheel carrier which is rotationally fixed to the rotating hub, or are fixed to the vehicle in some other way. During installation or repair work, the sensor is mounted not into the interior of the seal but separately onto the seal, so that there is no risk of contamination of the bearing.

The sealing arrangement is preferably embodied as a cassette seal. Here, the significant elements of the sealing arrangement are combined to form a modular unit composed of supports, covering cap, seal and encoder. Storage, transport and assembly into the bearing unit are therefore simplified. The sealing arrangement can be exchanged for sealing arrangements according to the prior art without it being necessary to carry out changes to the construction of the bearing unit for installation space reasons.

The active and radially outwardly aligned face of the encoder is preferably designed in the form of the lateral surface of a circular cylinder, or forms an (outer) lateral surface of a circular truncated cone. The radially outwardly aligned active (sur)face of the encoder is preferably designed in the form of a rotationally symmetrical hollow cylinder or truncated cone in a single-part encoder, or is assembled, in multi-part form, of a plurality of segments on a truncated cylinder/cone of said type. The significant advantages of an encoder having the lateral surface of a circular truncated cone are a uniform magnetic field strength over the entire circumference, and high precision in the pitch of the polarization of the magnetized encoder. The cone angle of the encoder is preferably $50°<=\alpha<=15°$.

BRIEF DESCRIPTION OF THE DRAWINGS

The present invention will be better understood by the following detailed description in conjunction with the accompanying drawings, in which.

DESCRIPTION OF THE DRAWINGS

Figure 1:
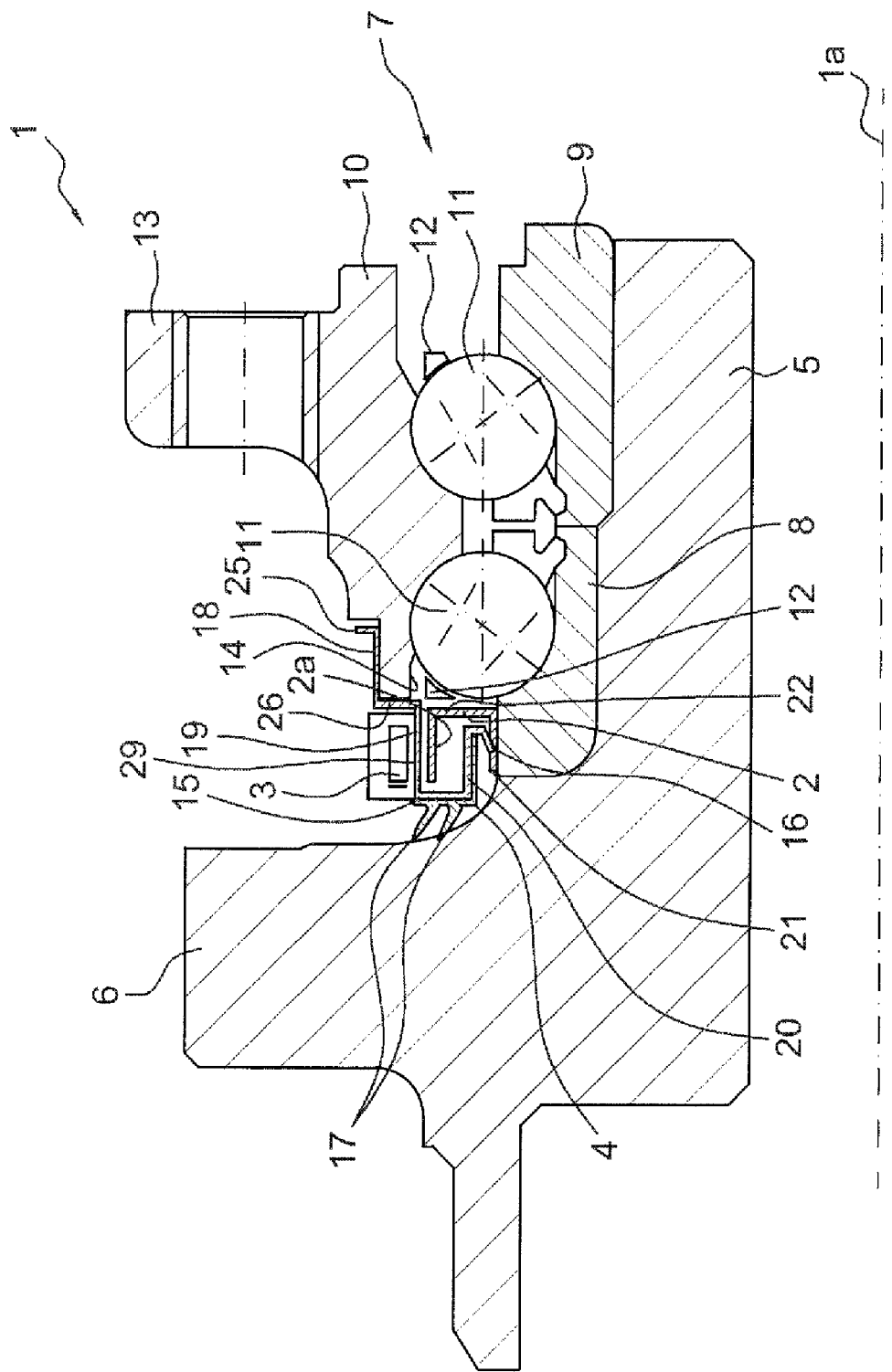
FIG. 1 is an exemplary embodiment of the wheel bearing arrangement comprising an encoder and a sensor.

FIG. 1 shows a wheel bearing arrangement 1 in a section illustration along the rotational axis 1a. The wheel bearing arrangement 1 has at least one encoder 2, at least one sensor 3, a seal 4 which is arranged concentrically with respect to the rotational axis 1a, and a hub 5 which is mounted in the wheel bearing arrangement 1 so as to be rotationally moveable. The hub 5 has a radial flange 6 which is in this case formed in one piece with the hub 5 and is aligned radially away from the rotational axis 1a. The radial flange 6 is provided for fastening a vehicle wheel (not illustrated) at the left-hand side in the figure. The hub 5 and therefore the vehicle wheel are mounted so as to be rotatable about the rotational axis 1a by means of a wheel bearing 7. The wheel bearing 7 is in this case formed by two inner rings 8 and 9, an outer ring 10 and rolling bodies 11 in cages 12. The outer ring 10 is embodied as a wheel carrier and has, for this purpose, a flange 13 for fastening the wheel to the vehicle by means of the wheel bearing arrangement 1. In this case, two inner raceways for the rolling bodies 11 in the form of balls are formed directly on the wheel carrier.

The seal 4 seals off at least the radial annular gap 14 between the inner rings 8 and the outer ring 10 at the side of the radial flange 6, and has a covering ring 15 made from a non-ferromagnetic material, a first elastic sealing lip 16 and two elastic second sealing lips 17.

Figure 2:
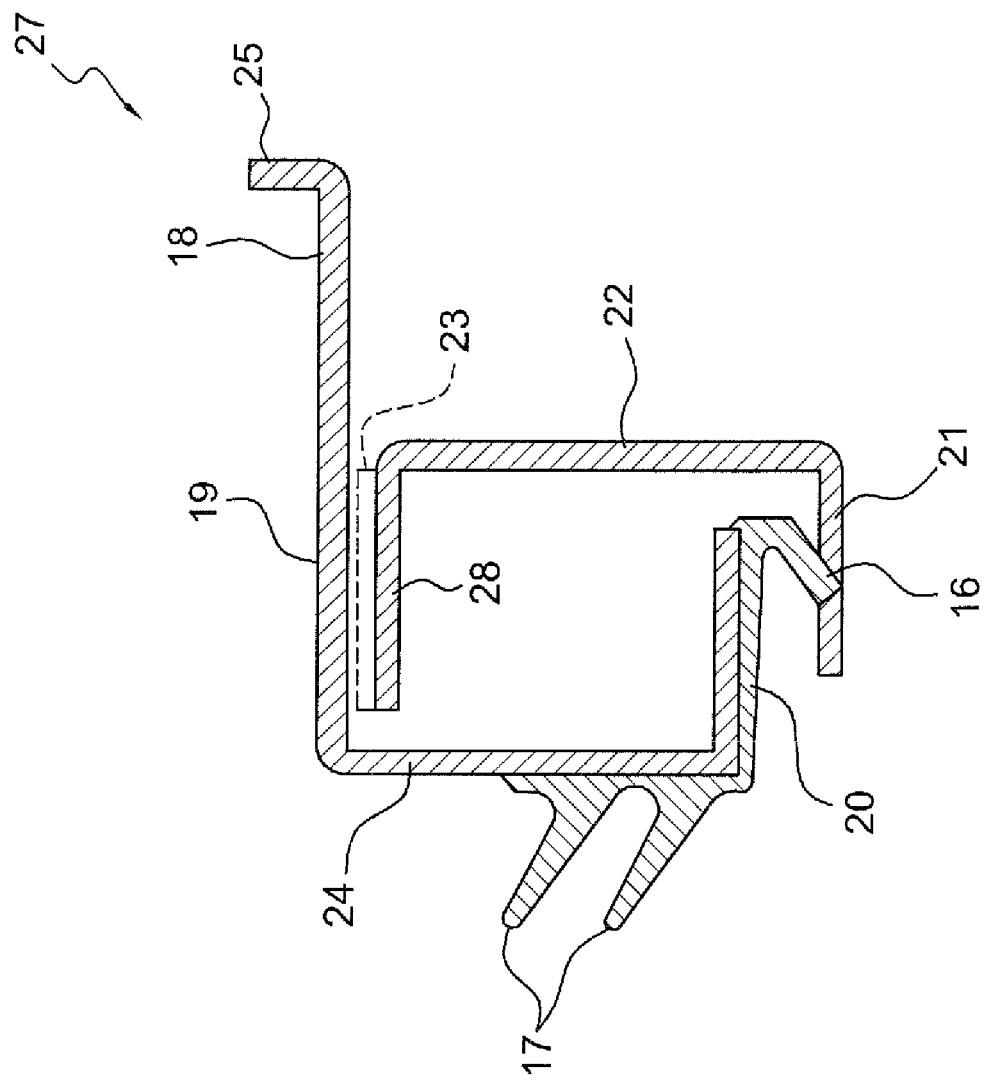
FIG. 2 shows the alternate embodiment of sealing arrangement shown in FIG. 1.

The covering ring 15 is formed as a sheet metal part in the shape of a cup, and is seated by means of one hollow cylindrical seat 18 on an outer section of the outer ring 10. The hollow cylindrical seat 18 has a radial collar 25, which, as a result of the drawing process of the cup, is an aid for pressing the seal 4 onto the outer ring 10, with the pressing tool being supported on said collar 25. The seat 18 is adjoined initially by an axial stop 26, which is followed by a first annular section 19. FIG. 2 illustrates a seal 27 in which the seat 18 alternatively merges directly axially into the first annular section 19. The arrangement according to FIG. 1 has the advantage that the sensor 3 is fitted into the annular groove 29 in a protected fashion.

The first annular section 19 is arranged concentrically with respect to the hub 5 and runs radially between the encoder 2 and the sensor 3. The first annular section 19 is adjoined, as viewed axially from the annular gap 14, by a disk section 24 which is formed at least partially axially between the annular gap 14 and the radial flange 6. A second annular section 20 of the covering ring 15 proceeds from the disk section 24 thereof. The second annular section 20 is arranged concentrically with respect to the hub 5 and is surrounded at the peripheral side by the signal-active part 2a of the encoder 2 and by the first annular section 19.

The encoder 2 is arranged largely at the inside of the seal 4, and is rotationally moveable about the rotational axis 1a with the hub 5. For this purpose, the encoder 2 is rotationally fixedly joined to the hub 5 by means of a hollow cylindrical seat 21 which runs around the hub 5 and around one of the inner rings 8 and is fixed to the hub 5 and to the inner ring 8. The signal-active part 2a of the encoder is optionally a sheet metal signal emitter which is formed in one piece with the seat 21 and with the radial web 22, or as indicated by dashed lines in FIG. 2, an encoder 23 which is fixed to the seat 21 and to the web 22 on a metal support plate 28.

The first sealing lip 16 is fixed to the covering ring 15 and bears sealingly against the seat 21. The sealing lip 16 which bears against the encoder 2 is fixed to the second annular section 20. The sealing lips 17 which are arranged upstream are fixed to the disk section 24 and bear sealingly against the radial flange 6.

LIST OF REFERENCE SYMBOLS

1 Wheel bearing arrangement
1a Rotational axis
2 Encoder
2a Signal-active part
3 Sensor
4 Seal
5 Hub
6 Radial flange
7 Wheel bearing
8 Inner ring
9 Inner ring
10 Outer ring
11 Rolling bodies
12 Cage
13 Flange
14 Annular gap
15 Covering ring
16 Sealing lip
17 Sealing lip
18 Seat
19 Annular section
20 Annular section
21 Seat
22 Web
23 Encoder
24 Disk Section
25 Collar
26 Axial stop
27 Seal
28 Metal support plate

The invention claimed is:

1. A wheel bearing arrangement, comprising:
at least one encoder;
at least one sensor;
a hub which is mounted in the wheel bearing arrangement so as to be rotationally moveable;
a radial flange of the hub being aligned radially away from the rotational axis;
a radial annular gap between the hub and an outer ring, the outer ring having an inner raceway for rolling bodies and the radial annular gap facing the radial flange;
a seal, concentric to the rotational axis, mounted on the hub and mounted externally to the outer ring, the seal is completely external to the radial annular gap, sealing off the radial annular gap,
the seal having at least one covering ring, which is made from a non-ferromagnetic material, and having at least one elastic first sealing lip, the first sealing lip being fixed to the covering ring and bearing sealingly against the encoder;
at least one signal-active part of the encoder being arranged at the inside of the seal and being rotationally moveable with the hub about the rotational axis;
the seal having at least one second sealing lip which bears sealingly against the radial flange; and,
the sensor being arranged at the outside of the seal and opposite the encoder, and the covering ring extending at least between the encoder and the sensor.

2. The wheel bearing arrangement as claimed in claim 1, wherein the covering ring is made from sheet metal.

3. The wheel bearing arrangement as claimed in claim 1, wherein said covering ring has at least one first annular section, with the first annular section being arranged concentrically with respect to the hub and running radially between the encoder and the sensor.

4. The wheel bearing arrangement as claimed in claim 3, wherein said covering ring has a first disk section adjoining the first annular section, and being formed at least partially axially between the annular gap and the radial flange, as viewed axially from the annular gap.

5. The wheel bearing arrangement as claimed in claim 4, wherein the covering ring has a second annular section proceeding from the disk section thereof, and the second annular section, arranged concentrically with respect to the hub, being surrounded at the circumferential side by the first annular section.

6. The wheel bearing arrangement as claimed in claim 5, wherein the second annular section runs axially between the annular gap and the radial flange.

7. The wheel bearing arrangement as claimed in claim 5, wherein the first sealing lip is fixed to the second annular section.

8. The wheel bearing arrangement as claimed in claim 7, wherein the encoder is rotationally fixedly joined to the hub by means of a hollow cylindrical seat which runs around the hub and is fixed to the hub, with the first sealing lip bearing sealingly against the seat.

9. The wheel bearing arrangement as claimed in claim 8, wherein the encoder has a hollow cylindrical signal-active part which is arranged concentrically with respect to the hub, with the part being arranged concentrically with respect to the rotational axis and at least partially radially between the first annular section and the second annular section, and running around the seat.

10. The wheel bearing arrangement as claimed in claim 9, wherein the seat and the signal-active part are formed in one piece from sheet metal.

11. The wheel bearing arrangement as claimed in claim 9, wherein the signal-active part is fixed to a metal support plate, with the metal support plate being provided in one piece with the seat.

12. The wheel bearing arrangement as claimed in claim 8, wherein the seat is seated on an inner ring, which is fixed with respect to the hub, of the wheel bearing arrangement, with the inner ring having at least one outer raceway for rolling bodies.

13. The wheel bearing arrangement as claimed in claim 8, wherein the second sealing lip is fixed to the disk section.

14. A wheel bearing arrangement, comprising:
 a hub which is rotatably mounted in the wheel bearing arrangement;
 a radial flange of the hub extending radially away from a rotational axis of the wheel bearing arrangement;
 at least one outer raceway for rolling bodies on the hub, adjacent the radial flange;
 at least one outer ring having an inner raceway for rolling bodies radially opposing the outer raceway;
 a plurality of rolling bodies positioned between the raceways of the inner and outer ring;
 at least one cage supporting the rolling bodies;
 a radial annular gap between the hub and outer ring, the annular gap facing the radial flange;
 a seal mounted on the hub and mounted externally to the outer ring, the seal is completely external to the radial annular gap, the seal sealing off the radial annular gap, the seal concentric to the rotational axis, the seal having
 a covering ring made of non-ferromagnetic material with a cylindrical seat fitted externally on the outer ring, a first annular section extending axially from the seat towards the radial flange, a disk section extending radially downward from the annular section towards the hub and a second annular section extending axially from the disk section towards the annular gap, a first sealing lip fixed to and extending radially down and from the second annular section and second sealing lips fixed to the disk section and extending axially toward and contacting the radial flange, and
 an inner ring concentric to the outer ring, the inner ring having an axial seat fixed to the hub, a web extending radially outward from the axial seat and inside the disk section of the covering ring and a support plate extending radially from the web towards the disk section of the covering ring and inside the first annular section of the covering ring;
 an encoder, having at least one signal-active part, mounted internal to the seal, positioned on the support plate inside the seal between the support plate and the first annular section of the covering ring; and
 a sensor mounted external to the seal on the first annular section of the covering ring.

* * * * *